Apr. 3, 1923. 1,450,680
A. GUAZZONI
CYCLE STAND AND BRUSH HOLDER
Filed Oct. 13, 1921
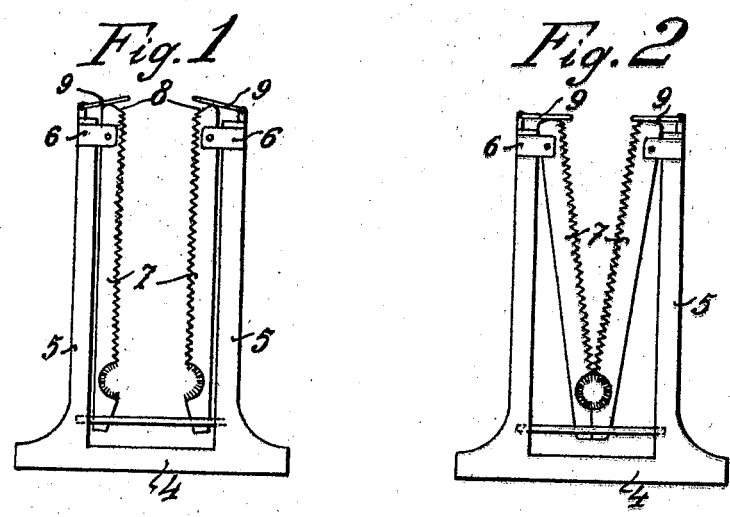
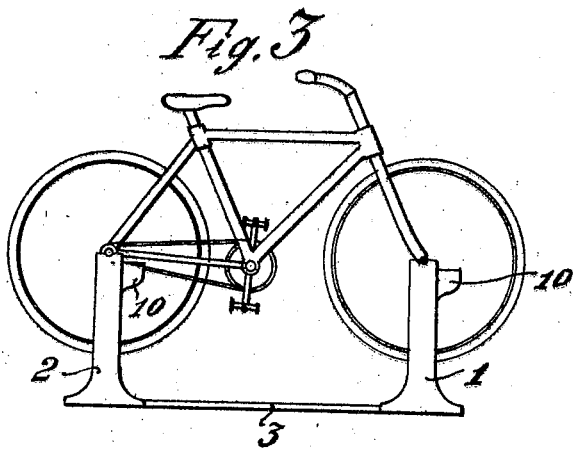
Inventor
Alberto Guazzoni
Att'y Patented Apr. 3, 1923.

1,450,680

UNITED STATES PATENT OFFICE.

ALBERTO GUAZZONI, OF ROME, ITALY.

CYCLE STAND AND BRUSH HOLDER.

Application filed October 13, 1921. Serial No. 507,486.

*To all whom it may concern:*

Be it known that I, ALBERTO GUAZZONI, a subject of the King of Italy, and residing at 50 Via Firenze, Rome, Italy, have invented certain new and useful Improvements in Cycle Stands and Brush Holders, of which the following is a specification.

The object of the invention is to provide a device which is constructed and arranged so as to support a bicycle or the like so that the wheels may be rapidly and efficiently cleaned and to provide a rest for the bicycle after the cleaning operation.

The device comprises two stands which are interconnected by a base plate intended to hold the stands the required distance apart, each stand comprising two uprights which have brushes pivotally secured thereto adapted to swing inwardly towards each other when the bicycle is placed on the stand.

The invention is shown, by way of example, in the annexed drawing, in which—

Fig. 1 is a sectional elevation of the device with the brushes in the open position, Fig. 2 is a similar view with the brushes in the closed position and Fig. 3 is a side view of a cycle arranged on the stand.

The device comprises two members 1 and 2 which are interconnected by a plate or the like 3. Each member consists of a base member 4 and two uprights 5, 5 preferably formed integrally with the base member. Each upright has at its upper end a lug 6 which has a brush 7 pivotally secured thereto arranged to extend downward inside the uprights and to be held in this vertical position through its own weight. The upper face 8 of the brush is formed with an inwardly inclined surface so that it may be acted on by a lever 9 hinged to the upright 5 for swinging it inwardly respecting the uprights.

When a bicycle is placed on the stand each of its members receives a wheel between the uprights and the ends of the forks are brought to rest on the upper end of the brushes 7 through the intermediary of the plates 9, the weight of the bicycle will cause the brushes to be swung inwardly and assume an inclined position. In this way the two brushes will approach each other at their lower ends and form a V-shaped opening to fit the contour of the wheels and spokes, as shown in Figure 2. The inside face of each brush is shaped in accordance with the outside shape of the bicycle wheel as indicated in the drawing and is lined with bristles and cloth pieces to form the cleaning surface.

It is evident that it is sufficient to turn the wheels of the bicycles about their axles a convenient number of times so that all parts of the wheels will come into contact with the brushes and be cleaned.

When the wheels have been cleaned the bicycle is lifted up and moved sideways onto brackets 10 arranged laterally on the uprights. The brushes are thus no longer acted on by the weight of the bicycle and return to their vertical position. In this way all contact between the wheels and the brushes is avoided after the cleaning operations have been finished and the wheels cannot be injured by the moisture on the brushes in case they have become wet during the cleaning of the wheels.

The invention thus provides a device which enables the bicycle wheels to be rapidly and efficiently cleaned, and a stand for the bicycle whereby all pressure on the tires is avoided and the bicycle is kept in good working condition.

Claims:

1. A bicycle wheel cleaner, comprising a stand provided with a pair of movable brushes, and means carried by the stand to engage and move the brushes toward each other when a bicycle is supported on said means.

2. A device of the class described, including a stand, and cleaning brushes movably mounted thereon for supporting a wheel and adapted to be moved to engage said wheel by the weight thereof on the brushes, whereby the brushes will clean the wheel when it is rotated.

3. A device of the class described, including a pair of interconnected stands having spaced uprights, a brush pivotally mounted on each upright and means for moving the brushes in each stand toward each other to engage the wheel of a bicycle under the weight of the bicycle.

4. A device of the class described, comprising a plurality of interconnected stands, each formed for supporting the wheel of a vehicle, and a pair of brushes pivotally mounted on each support, each brush having beveled upper end portions projecting above the support for receiving the hub portion of a wheel, whereby the weight of the vehicle will act through the hubs on the pairs of brushes on each support for moving the brushes of each pair inwardly toward each other to engage the wheels for effecting the cleaning thereof when the wheels are rotated.

5. In a device of the class described, a plurality of stands, each having a pair of spaced uprights, said uprights being formed with two supporting points, a brush pivotally mounted on each upright, means connecting the stands together, and means for moving the brushes on each stand toward each other under the weight of a vehicle, whereby when a vehicle is supported at one of said supporting points the brushes will be moved to engage the wheel for cleaning it when rotated, and when the vehicle is at the other supporting point it will be supported solely on the uprights.

In testimony whereof I have signed my name in the presence of two subscribing witnesses this 17th day of September, 1921.

ALBERTO GUAZZONI.

Witnesses:
ANGELO CARATTONI,
URELLO FONTURI.